(12) United States Patent
Sarkhel et al.

(10) Patent No.: US 12,131,350 B2
(45) Date of Patent: *Oct. 29, 2024

(54) ARTIFICIAL INTELLIGENCE TECHNIQUES FOR BID OPTIMIZATION USED FOR GENERATING DYNAMIC ONLINE CONTENT

(71) Applicant: Adobe Inc., San Jose, CA (US)

(72) Inventors: Somdeb Sarkhel, San Jose, CA (US); Saayan Mitra, San Jose, CA (US); Jiatong Xie, San Francisco, CA (US); Alok Kothari, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 506 days.

This patent is subject to a terminal disclaimer.

(21) Appl. No.: 17/403,702

(22) Filed: Aug. 16, 2021

(65) Prior Publication Data

US 2021/0374809 A1  Dec. 2, 2021

Related U.S. Application Data

(63) Continuation of application No. 16/687,082, filed on Nov. 18, 2019, now Pat. No. 11,127,050.

(51) Int. Cl.
  *G06Q 30/0273* (2023.01)
  *G06N 20/00* (2019.01)
  *G06Q 30/0241* (2023.01)

(52) U.S. Cl.
  CPC ......... *G06Q 30/0275* (2013.01); *G06N 20/00* (2019.01); *G06Q 30/0277* (2013.01)

(58) Field of Classification Search
  CPC .......... G06Q 30/0275; G06Q 30/0277; G06N 20/00; G06N 5/01; G06N 5/04
  USPC ...................................... 705/14.71
  See application file for complete search history.

(56) References Cited

U.S. PATENT DOCUMENTS

| | | | |
|---|---|---|---|
| 10,521,828 B2 * | 12/2019 | Pai | G06Q 30/0277 |
| 11,010,907 B1 * | 5/2021 | Bagwell | G06V 20/56 |
| 11,127,050 B2 * | 9/2021 | Sarkhel | G06Q 30/0275 |

(Continued)

OTHER PUBLICATIONS

Reacting_to_Variations_in_Product_Demand_An_Application_for_Conversion_Rate_CR_Prediction_in_Sponsored_Search (Year: 2018).*

(Continued)

*Primary Examiner* — Gautam Ubale
(74) *Attorney, Agent, or Firm* — Kilpatrick Townsend & Stockton LLP

(57) ABSTRACT

Techniques are disclosed for real-time bidding (e.g., for dynamic online content placement) using an optimized final bid. The final bid is determined based on a predicted clearing price and an initial bid. The initial bid represents a value to a prospective content provider, and may be computed based on campaign information. The predicted clearing price is a predicted amount paid, and may be predicted using a model trained using historical winning bids data. The clearing price may be predicted using a quantile regression model, where the quantile can be selected to control bid aggressiveness. In some cases, the quantile is determined based on pacing in an overall campaign. Once the initial bid and the predicted clearing price are calculated, the final bid is computed based on the initial bid and the predicted clearing price.

16 Claims, 7 Drawing Sheets

(56) References Cited

U.S. PATENT DOCUMENTS

| | | | |
|---|---|---|---|
| 2011/0218865 A1* | 9/2011 | Muthukrishnan | G06Q 30/0275 705/14.71 |
| 2012/0041816 A1* | 2/2012 | Buchalter | G06Q 30/0242 705/14.71 |
| 2012/0084142 A1* | 4/2012 | Li | G06Q 30/02 705/14.46 |
| 2014/0229273 A1* | 8/2014 | Garcia-Martinez | G06Q 30/0275 705/14.46 |
| 2015/0127469 A1* | 5/2015 | Cui | G06Q 30/0275 705/14.71 |
| 2015/0127470 A1* | 5/2015 | Ghosh | G06Q 30/0275 705/14.71 |
| 2017/0034591 A1* | 2/2017 | Ray | H04N 21/4532 |
| 2017/0116645 A1* | 4/2017 | Bishop | G06Q 30/0275 |
| 2017/0358007 A1* | 12/2017 | Pai | G06Q 30/0275 |
| 2017/0372352 A1* | 12/2017 | Riordan | G06Q 30/0277 |
| 2018/0108049 A1* | 4/2018 | Kitts | G06Q 30/0272 |
| 2018/0204249 A1* | 7/2018 | Vasile | G06Q 10/0635 |
| 2018/0204250 A1* | 7/2018 | Watine | G06Q 30/0275 |
| 2018/0218410 A1* | 8/2018 | Arora | G06Q 30/0267 |
| 2018/0330390 A1* | 11/2018 | Malaviya | G06Q 30/0202 |
| 2018/0365674 A1* | 12/2018 | Han | G06Q 30/06 |
| 2019/0080363 A1* | 3/2019 | Acuna Agost | G06N 7/01 |
| 2019/0205900 A1* | 7/2019 | Buchalter | G06Q 30/02 |
| 2020/0226675 A1* | 7/2020 | Mitra | G06N 3/084 |
| 2020/0401886 A1* | 12/2020 | Deng | G06N 3/088 |
| 2021/0150585 A1* | 5/2021 | Sarkhel | G06N 20/00 |

OTHER PUBLICATIONS

Real-time Bidding campaigns optimization using attribute (Year: 2019).*

A New Optimization Layer for Real-Time Bidding Advertising Campaigns (Year: 2018).*

Internet Advertising An Interplay among Advertisers and Web Users (Year: 2012).*

Agarwal et al. "Budget pacing for targeted online advertisements at linkedin", Proceedings of the 20th ACM SIGKDD international conference on Knowledge discovery and data mining. pp. 1613-1619. ACM (2014).

Balseiro et al. "Repeated auctions with budgets in ad exchanges: Approximations and design," Management Science, 61(4), pp. 864-884 (2015).

Cui et al., "Bid landscape forecasting in online ad exchange marketplace," KDD, pp. 265-273. ACM (2011).

Edelman et al., "Internet advertising and the generalized second-price auction: Selling billions of dollars worth of keywords," American economic review 97(1), 242-259, (2007).

Kridel et al., "Adaptive Modeling for Real Time Analytics: The Case of "Big Data" in Mobile Advertising", 48th Hawaii International Conference on System Sciences Available Online at: DOI:10.1109/HICSS.2015.111, Mar. 2015, 10 pages.

Lang et al., "Handling forecast errors while bidding for display advertising," Proceedings of the 21st international conference on World Wide Web, pp. 371-380, ACM (2012).

Lee et al., "Real Time Bid Optimization with Smooth Budget Delivery in Online Advertising", Available Online at: DOI:10.1145/2501040.2501979, May 14, 2013, 14 pages.

Miralles-Pechuan et al., "Real-time Bidding Campaigns Optimization using Attribute Selection", Available Online at: https://www.researchgate.net/publication/336889719, Oct. 29, 2019, 24 pages.

Wang et al., "Display advertising with real-time bidding (rtb) and behavioural targeting," arXiv preprint arXiv:1610.03013 (2016).

Wang et al., "Functional bid landscape forecasting for display advertising," ECML-PKDD. pp. 115-131, Springer (2016).

Wu et al., "Deep censored learning of the winning price in the real time bidding," Proceedings of the 24th ACM SIGKDD International Conference on Knowledge Discovery & Data Mining. pp. 2526-2535. ACM (2018).

Wu et al., "Predicting winning price in real time bidding with censored data," KDD. pp. 1305-1314. ACM (2015).

Xu et al., "Smart Pacing for Effective Online Ad Campaign Optimization", Available Online at: 10.1145/2783258.2788615, Jun. 2015, 10 pages.

Yuan et al., "Real-time bidding for online advertising: measurement and analysis," Proceedings of the Seventh International Workshop on Data Mining for Online Advertising. p. 3. ACM (2013).

Zhang et al., "Optimal real-time bidding for display advertising," Proceedings of the 20th ACM SIGKDD international conference on Knowledge discovery and data mining, pp. 1077-1086. ACM (2014).

Zhu et al., "A gamma-based regression for winning price estimation in real-time bidding advertising," Big Data (Big Data), 2017 IEEE International Conference on. pp. 1610-1619. IEEE (2017).

John Langford, Alex Strehl, and Lihong Li. Vowpal Wabbit, 2007. https://github.com/VowpalWabbit/vowpal_wabbit.

* cited by examiner

ARTIFICIAL INTELLIGENCE TECHNIQUES FOR BID OPTIMIZATION USED FOR GENERATING DYNAMIC ONLINE CONTENT

CROSS-REFERENCE TO RELATED APPLICATIONS

This application is a Continuation of U.S. application Ser. No. 16/687,082, filed on Nov. 18, 2019, which is incorporated herein by reference.

TECHNICAL FIELD

This disclosure generally relates to artificial computer-implemented intelligence (AI) systems that facilitate modifications to an online environment. More specifically, but not by way of limitation, this disclosure describes AI techniques for bid optimization that facilitate real-time generation of dynamic online content.

BACKGROUND

Dynamic online content is adapted based on the user to view the content. For example, a web browser may detect and store preferences, interests, and behaviors of the user to view the content, which is used to identify content to display. Such content is typically generated at the moment a user requests a page. For example, primary content providers have a website. The primary content providers generate relatively static content, such as images and text on the website. The primary content providers may modify certain portions of the website to include secondary content from other content providers.

Such secondary content may be selected based on real-time bidding for placing the secondary content (e.g., an advertisement). For a secondary content provider (e.g., an advertiser) that places a winning bid, the secondary content is instantly displayed. This "real-time bidding" process can occur in a fraction of a second, making it impractical, if not impossible, to perform manually. Thus, secondary content providers often utilize software tools that generate and transmit bids quickly enough to, for example, obtain an open slot in primary content (e.g., a web page) in which secondary content (e.g., a banner advertisement) can be inserted.

While existing software tools can automatically select or generate a bid for this real-time bidding process, these techniques often result in inefficient allocations of resources (e.g., resources applied to underbidding and losses or resources applied to excessive bids). For example, a bid could be selected by determining the economic value of the content placement to the secondary content provider. This economic value may be based on preferences configured by the secondary content provider (e.g., a particular type of target user or website might be worth more to the secondary content provider than others). But, relying solely on these preferences can result in underbidding, where a predicted bid is too low to win an auction. Therefore, other techniques involve using models to predict a winning bid. However, these model-based techniques frequently result in overbidding, where an estimated winning bid is much higher than needed to win an auction. This overbidding result may occur if a particular model is been trained to take an overly aggressive approach to computing bids. For instance, a model may be too aggressive if a model is generated by heavily penalizing losing bids, even if the losing bids are close to the winning bid (e.g., a bid for $5 is weighted as a bad bid, when the winning bid was for $5.01). Thus, existing models tend to overbid or underbid and lack flexibility, which in turn prevents a provider of secondary content from having that content inserted into primary content such as web page.

Accordingly, existing techniques for computing real-time bids that are used for dynamic placement of secondary online content present disadvantages such as (but not limited to) those described above.

SUMMARY

The present disclosure generally relates to AI techniques for bid optimization that facilitate real-time generation of dynamic online content. Techniques are described for determining an optimized bid that is both likely to be a winning bid and likely to not be an overbid (e.g., not be significantly higher than the next-highest bid).

In some embodiments, a bid generation computer system receives, from a content placement system, a bid request for a dynamic content placement opportunity. The bid generation computer system determines, for a secondary content provider, an initial bid for the bid request. The initial bid may be determined based upon campaign information configured for the secondary content provider. Furthermore, the bid generation computer system selects, based on a quantile value, a pretrained model, from a plurality of pretrained models trained using historical winning bids data, the historical winning bids data including a plurality of data points, each data point corresponding to a historical winning bid and a clearing price corresponding to the historical winning bid. The bid generation computer system uses the selected pretrained model to predict a clearing price for the bid request using the selected pretrained model and information associated with the bid request. The bid generation computer system computes, based upon the determined initial bid and the predicted clearing price, a final bid. The bid generation computer system communicates the final bid to the content placement system as a response to the bid request. In some embodiments, communicating the final bid to the content placement system causes a primary content provider to provide a user device with access to dynamic online content, such as a web page in which primary content (e.g., a blog) is displayed with interactive secondary content (e.g., a clickable banner advertisement).

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
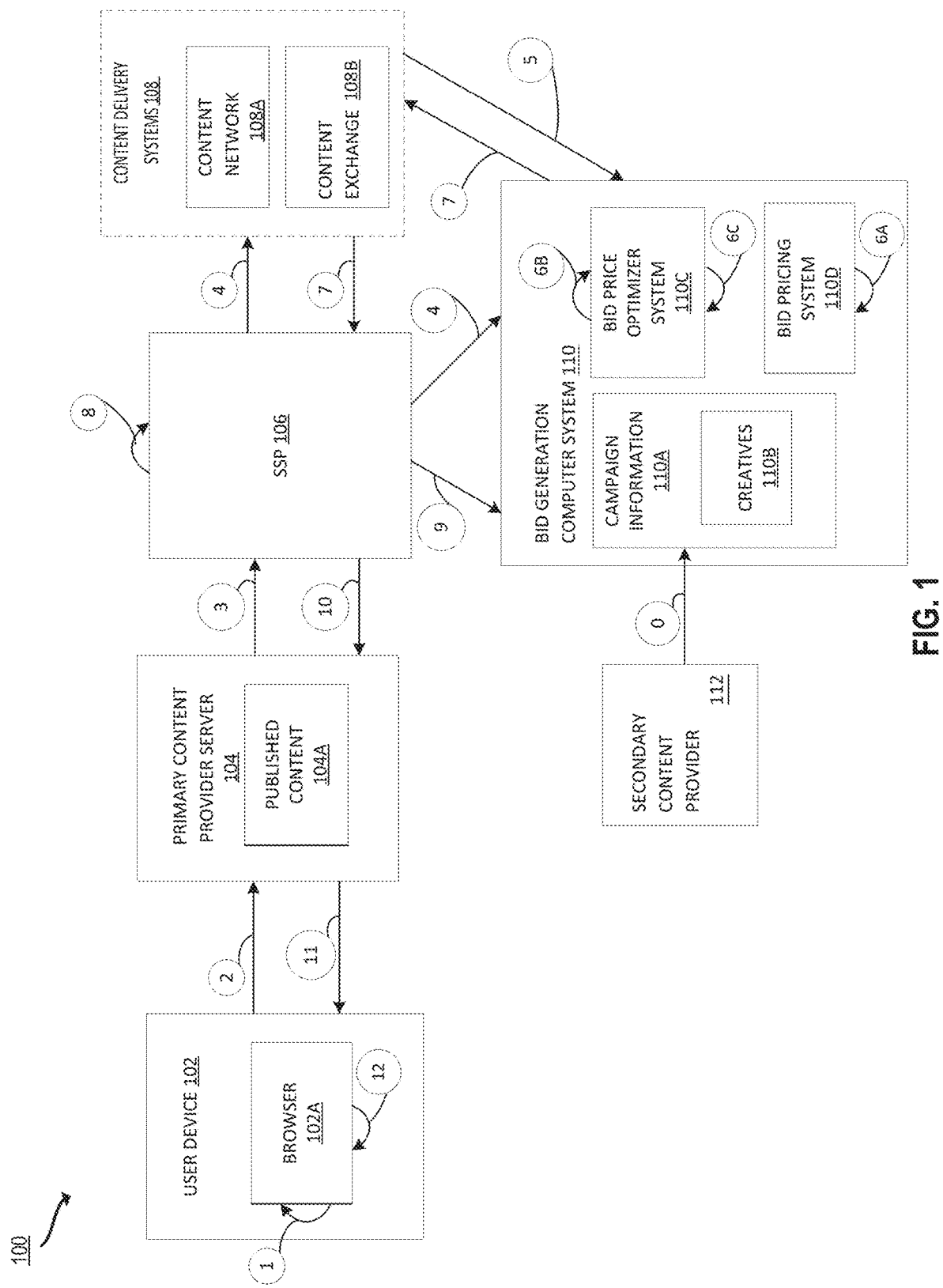
FIG. 1 depicts an example of a computer system for optimizing a bid, according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "an example" is not necessarily to be construed as preferred or advantageous over other embodiments or designs. Various embodiments are described herein, including methods, systems, non-transitory computer-readable storage media storing programs, code, or instructions executable by one or more processors, and the like.

The present disclosure describes computer-implemented artificial intelligence (AI) techniques for bid optimization that facilitate real-time generation of dynamic online content. Certain embodiments involve generating an optimized bid, which ultimately impacts which secondary content (e.g., online advertisement) is dynamically placed within primary content (e.g., a web page), based on a predicted clearing price and an initial bid that reflects bidder preferences. AI techniques are used in the bid optimization by, for example, predicting the clearing price with an appropriate model that has been trained using data describing historical winning bids.

The following non-limiting example is used to introduce certain embodiments. In this example, a bid generation computer system receives a bid request for a dynamic content placement opportunity and generates a bid that facilitates the placement of dynamic online content from a secondary content provider (e.g., an online advertiser) within online content from a primary content provider (e.g., a host system for a website). Dynamic online content may include secondary content, such as a clickable advertisement with a link to a third-party website, that is added to primary online content, such as a web page or a mobile application, for short periods of time. The bid generation computer system, which is used by one or more secondary content providers, can receive the request from a content placement system. The content placement system aggregates opportunities to place secondary content identified by different providers of primary content (e.g., websites) and coordinates bids from different providers of secondary content (e.g., online advertisements).

Continuing with this example, the bid generation computer system determines, for the bid request, an initial bid to be submitted on behalf of a secondary content provider (e.g., an advertiser). The secondary content provider could be used to implement a content placement campaign, such as a campaign to place banner ads on fashion blogs, that aligns with the dynamic content placement opportunity, such as an opportunity to include dynamic content on a fashion blog hosted by a primary content provider. The initial bid may be determined based upon campaign information configured for the secondary content provider. This campaign information allocates different values to particular blogs, viewers, and times of day, and thereby indicates how much the secondary content provider is willing to pay for a dynamic content placement opportunity.

In this example, the bid generation computer system optimizes the initial bid. For instance, the bid generation computer system selects, based on a quantile value, a pretrained model from a set of pretrained models. The pretrained models are trained with historical winning bids data, which includes data points identifying historical winning bids, associated clearing prices, and other information relevant to a dynamic content placement opportunity. The quantile is a hyperparameter used to control the aggressiveness of the model, which allows the bid generation computer system to select a particular pretrained model that avoids an approach to bid optimization that is over-aggressive or under-aggressive. The bid generation computer system may obtain the quantile value from a bidder (e.g., to tune aggressiveness). Alternatively, the bid generation computer system may identify a quantile value based on campaign parameters such as pacing. Selecting a particular model (e.g., a certain level of aggressiveness) using the quantile value allows the bid generation computer system to avoid unnecessarily expending resources on bids that are too aggressive, or not aggressive enough, by maintaining different models that are tuned based on a desired aggressiveness and robust to outliers in the training data.

The bid generation computer system predicts a clearing price for the bid request by applying the selected pretrained model to information associated with the bid request (e.g., details of the current dynamic content placement opportunity). The bid generation computer system computes a final bid based on the determined initial bid and the predicted clearing price by, for example, by using a weighted combination of the two bids.

The bid generation computer system communicates the final bid to the content placement system as a response to the bid request. In this example, communicating the final bid to the content placement system causes a primary content provider (e.g., the host system for the fashion blog) to provide a user device with access to a dynamic online content. For instance, the content placement system could notify the primary content provider of the winning bid, and the primary content provider can retrieve, from the secondary content provider associated with the winning bid, secondary content (e.g., a clickable banner advertisement) to be placed within a web page (i.e., primary content) hosted by the primary content provider.

Certain embodiments provide improvements to bid generation computer systems that facilitate the delivery of dynamic online content to user devices. As described above, existing model-based bidding techniques can lead to overbidding or underbidding. Such problems associated with conventional techniques are remedied by the bid optimization functionality described in this disclosure. For instance, since a model used to predict a clearing price is selected using quantiles, which control the desired aggressiveness in a bid, the bid generation computer system can modify the aggressiveness of the bidding approach in a manner that is appropriate for a particular campaign, while allowing the algorithm to generate an accurate prediction. In addition, the bid generation computer system's use of a determined initial bid further mitigates overbidding. For instance, a determined initial bid can indicate a value of a dynamic content placement opportunity to a given secondary content provider. Therefore, computing a final bid from a combination of the determined initial bid and the predicted clearing price can, for example, result in a final bid that is more likely to result in a win (e.g., approaches the predicted clearing price) without drastically exceeding the value of the dynamic content placement opportunity to a content provider (i.e., the determined initial bid).

As used therein, the term "dynamic online content" is used to refer to online content that includes a combination of primary content from a primary content provider and secondary content selected from a set of different secondary content providers. For instance, primary content could include the typical layout, content, or functionality of a website, an end-user application installed on a mobile device, or some combination thereof. Secondary content could include electronic content that is presented with the primary content for a short period of time, such as a clickable banner advertisement that is temporarily displayed on a webpage of a website or an interface of an end-user application until a user closes the webpage or end-user application. Such a combination of primary content and secondary content is dynamic because, for example, different secondary content items are selected and displayed with the primary content in different time periods.

As used therein, the term "quantile" is used to refer to a point in a distribution in relation to other values in the distribution. Quantiles may be used to divide a distribution into continuous intervals. Quantiles may be determined using a quantile function, which assigns values to probabilities using a probability density function. One example of quantiles is percentiles, which are quantiles on a scale relative to 100. For example, the 90th percentile represents data with a value above 90% of the other data in the data set. Similarly, quantiles can be used to segregate and compare statistical data within a dataset.

As used therein, the term "initial bid" is used to refer to a suggested price for an impression that is determined prior to applying model-based optimization techniques described herein. An initial bid may be iteratively determined. For instance, a bid generation computer system can compute a bid and then further adjust that bid to obtain the "initial" bid that is used, in combination with a predicted clearing price, to compute a final bid.

As used therein, the term "clearing price" is used to refer to the final price paid for an impression. A clearing price may be determined based on supply and demand. More specifically, a seller may ask for bids, and the clearing price may be determined based on bids received in response to the ask. The clearing price may have various relationships to winning bids, depending on a type of associated auction. For example, in a "first-price auction," the winning (e.g., highest) bid is equal to the clearing price. In a "second-price auction," the winning bid is determined based upon the second-place (e.g., second-highest) bid. For example, the clearing price in a second-price auction may be set to the second-place bid amount plus one cent.

As used herein, the term "impression" is used to refer to an instance when content is viewed by a user or displayed on a web page. The number of impressions of given content may be determined based upon a number of times a web page is located and loaded. An impression is an estimate of the number of people given content is reaching, and may be counted in different ways depending upon the way the content is situated on the page, as well as the number of times the web page where the content appears is shown.

As used herein, the term "pacing" is used to refer to performing an action at a particular rate based on a desired goal and a timeframe. As a specific example, "spend pacing" refers to providing content placement spending in a steady or consistent manner. Generally, spend pacing refers to pacing spend during a time duration, such as a day. In this manner, rather than spending a budget in the early hours of a day, the budget can be spent in a generally consistent manner throughout the day. Pacing may correspond to a measure of actual content placement goals achieved as compared to target content placement goals over a time period.

Referring now to the drawings, FIG. 1 depicts an example of a computing environment 100 that includes a bid generation computer system 110, such as a demand side platform (DSP), that communicates with various other computer systems and thereby facilitates the delivery of dynamic online content to a user device 102. Examples of these other computer systems include a primary content provider server 104 (e.g., a web publisher server), a supply-side platform (SSP) 106, content delivery systems 108, and a secondary content provider 112. The bid generation computer system 110 includes processing hardware that executes program code for optimizing and placing a bid on behalf of a secondary content provider 112. Computing environment 100 further includes a user device 102 on which dynamic content is to be displayed, a primary content provider server 104 that hosts the content (the publisher is also referred to herein as a "primary content provider"), content delivery systems 108 for managing auctions, and a supply-side platform (SSP) 106 that handles content placement on behalf of the publisher.

A communication flow among these devices is depicted, in FIG. 1, using operations 0-12. Secondary content provider 112 may transmit campaign information 110A to bid generation computer system 110, as indicated by operation 0 in FIG. 1. The secondary content provider 112 may be an entity that provides secondary web content such as advertisements. Such secondary web content may be dynamic in that the content is generated at the moment a user requests a page, and is customized to the user's behavior, preferences, and interests of the user. The campaign information 110A may include targets for placing dynamic content (e.g., a particular type of webpage or video), amounts to spend, a quantity of content to place, and the like.

A real-time bid may be initiated based on user interaction with a user device 102. User device 102 may be, for example, a personal computer, smartphone, tablet, or the like. In FIG. 1, operation 1 involves a browser 102A of user device 102 being used. For example, in browser 102A, the user may click a link to a website, enter the website's name, or enter the website's Uniform Resource Locator (URL). Browser 102A requests certain content from a particular publisher. The publisher may be an entity that provides primary online content, such as a video, website, or email interface.

In operation 2, user device 102 establishes a connection with primary content provider server 104. Primary content provider server 104 may be a powerful computer or cluster of computers operated by the publisher for hosting and publishing web content. Primary content provider server 104 may perform back-end functionality for generating and serving published content 104A to a publisher web site for display on browser 102A. User device 102 may request content from publisher web site 104 based on the information received in 102 (e.g., a URL). The requested content may be published content 104A (e.g., primary online content) such as an article, a video, a blog post, a social media page, or the like.

In operation 3, if published content 104A has a space for placement of associated dynamic content, then primary content provider server 104 transmits a signal to SSP 106. SSP 106 may be an server that performs content-placement-related functions on behalf of the publisher. Such content-placement-related functions may include facilitating the sale of digital content impressions (e.g., views) via automated auctions. The information sent to the SSP can include information about the requested content, information about the user, information about the user's device, and so on.

Upon receiving the information from primary content provider server 104 in operation 3, SSP 106 may determine that the dynamic content placement opportunity is to be opened up for RTB. In operation 4, upon determining that the dynamic content placement opportunity is to be opened up for RTB, the publisher's server makes the dynamic content placement opportunity available to multiple secondary content providers through an auction process.

In operation 4, SSP 106 may transmit information about the dynamic content placement opportunity to one or more content delivery systems 108. Content delivery systems 108 are technology platforms that facilitate the transfer of content space across multiple entities (e.g., buyers and sellers). Content delivery systems enable secondary content providers to easily obtain content space across a range of sites at once, as opposed to negotiating directly with specific publishers. Content delivery systems may be content networks (e.g., content network 108A), which typically mark up content space inventory and sell the content space for a profit. Content delivery systems may be content exchanges (e.g., content exchange 108B), which aggregate content placement opportunities, typically without marking up the prices. Alternatively, or additionally, SSP may transmit information about the opportunity directly to a set of DSPs (e.g., bid generation computer system 110). The SSP 106 and/or content delivery systems 108, may be referred to herein as a "content placement system."

In some instances, in operation 5, bid generation computer system 110 may receive the bid request from content network 108A or content exchange 108B. Alternatively, or additionally, bid generation computer system 110 may receive the bid request directly from SSP 106 in operation 4, as described above.

Bid generation computer system 110 is a programmatic buying system that interfaces with content delivery systems 108 (e.g., multiple content networks 108A and/or content exchanges 108B) to fulfill the task of enabling secondary content providers 112 to purchase content placement inventory in real-time from a choice of numerous (e.g., billions) of impressions every day that might be distributed across the globe. Bid generation computer system 110, operating on behalf of secondary content provider 112, may be requested to meet specific spend constraints based on a monetary budget or impression budget provided by a particular secondary content provider 112. Further, to effectively control overspend or underspend, a bid generation computer system 110 may control and pace spending. Bid generation computer system 110 may be preconfigured with one or more campaigns for one or more secondary content providers. Secondary content providers may set up campaigns in bid generation computer system 110, including targets and creatives. Based upon the information configured for the campaigns, bid generation computer system 110 performs processing to identify one or more campaigns that are a match for a particular dynamic content placement opportunity.

To appropriately and effectively handle media traffic from regional content placement systems, bid generation computer system 110 may be distributed (e.g., globally distributed) and not centralized. As such, the components of bid generation computer system 110 can be distributed (e.g., globally distributed). Although bid generation computer system 110 is generally described as being associated with a third-party operating on behalf of a secondary content provider 112, the functionality described herein can similarly be used directly by a secondary content provider 112 (e.g., via an secondary content provider device or system) to facilitate real-time bidding by the secondary content provider. In this regard, the functionality described in connection with bid generation computer system 110 can be employed via an entity providing dynamic content in an effort to pace spending for placement of such dynamic content. Further, such technology might additionally or alternatively be implemented by a content delivery system 108, such as content network 108A or content exchange 108B, for utilization by a secondary content provider 112, or representative thereof, to employ the functionality described herein. For example, content exchange 108B might offer such functionality for access and use by a secondary content provider 112.

Bid generation computer system 110 includes bid optimizer system 110C and bid pricing system 110D (which may collectively be referred to herein as a "bid generation computer system"). For each interested campaign, bid pricing system 110D determines an initial bid for the bid request. Bid optimizer system determines optimized, or final, bids, which may be based in part on the initial bid determined by bid pricing system 110D. Bid optimizer system further predicts a clearing price for use in determining the final bid. Bid generation computer system 110 further includes campaign information 110A. Bid generation computer system 110 may manage multiple campaigns. Each campaign may correspond to a set of dynamic content to be placed by a particular secondary content provider 112. For a given campaign, bid generation computer system 110 may store corresponding campaign information 110A such as secondary content provider 112 preferences and creatives 110B. Creatives 110B may specify the look, feel, style, type, and content of the dynamic content to be placed. Secondary content provider 112 preferences may include target pacing information, types of viewers or publishers to target, and so forth.

In operation 6A, bid pricing system 110D calculates an initial bid for one or more content impressions. The initial bid represents how much the content impression(s) are worth to a particular secondary content provider. The initial bid may be computed based on factors such as the type of dynamic content, the type of user to view the dynamic content, and campaign information established by the secondary content provider. In operation 6B, bid optimizer system 110C computes a predicted clearing price. Bid optimizer system 110C may compute the predicted clearing price using a pretrained machine learning model, as described in detail below with respect to FIG. 4. In operation 6C, bid optimizer system 110C computes a final bid based upon the bid generated by the bid pricing system in operation 6A and based upon the predicted clearing price computed in operation 6B. Computing the final bid is described in detail below with respect to FIGS. 3-5.

In operation 7, the final bid is communicated to the content placement system. The final bid may be transmitted to SSP 106 via content network 108A or content exchange 108B (e.g., bid generation computer system 110 transmits the final bid to content exchange 108B and content exchange 108B transmits the final bid to SSP 106). Alternatively, or additionally, bid generation computer system 110 may transmit the final bid directly to SSP 106. In some embodiments, the corresponding creative may be communicated to SSP 106 along with the final bid.

In operation 8, SSP 106 receives multiple bid responses for the bid request, and determines a winning bid. In addition to the bid response received in operation 7, SSP may receive bid responses from multiple other secondary content providers. The winning bid may correspond to the highest bid, of the multiple bid responses received from the multiple secondary content providers.

SSP 106 may further determine a clearing price for the auction. The clearing price may vary based on the type of the auction (e.g., first-price or second-price). For example, for a first-price auction, the clearing price is equal to the winning bid. As a specific example, for a first-price auction, if the highest bid is $1, then the clearing price is $1. For a second-price auction, the clearing price is computed based on incrementing the second-place bid. As a specific example, for a second-price auction, if the highest bid is $1, and the second-highest bid is 75 cents, the clearing price is 75 cents plus 1 cent equals 76 cents.

In operation 9, information regarding the clearing price may be communicated from SSP 106 to bid generation computer system 110. When multiple bids are received, SSP 106 may identify a particular DSP corresponding to the winning bid, and transmit the information the particular DSP identified.

In operation 10, creative 110B corresponding to the winning bid is added to the content requested in operation 1. In operation 11, the content is transmitted by primary content provider server 104 to user device 102 for display, and in operation 12, browser 102A displays the content. The requested content, along with creative 110B (e.g., the secondary content placed via the auction), is presented to the user via browser 102A of user device 102.

The entire RTB cycle from the start of the bid request to when the dynamic content is served to the user along with the requested primary content generally takes under approximately 200 milliseconds. Millions of users typically load a page at the same time. Content exchanges may send all these available content space requests to bid generation computer system 110. Then bid generation computer system 110 evaluates each impression according to the requirements of a campaign and starts the bidding process. The winning creative 110B is determined and served to the user.

Figure 2:
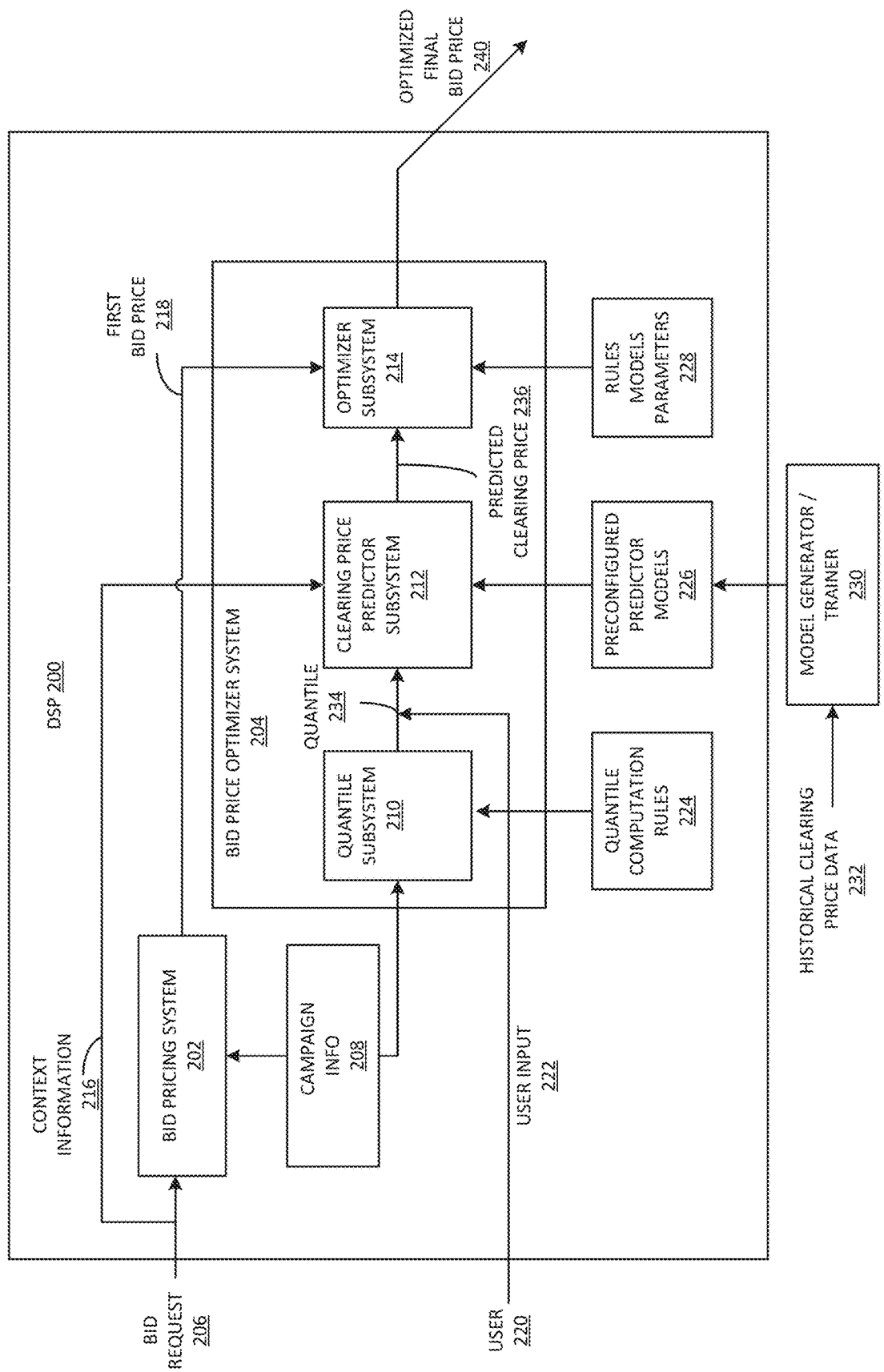
FIG. 2 depicts an example of a demand side platform, which may be part of a computer system for optimizing a bid, according to certain embodiments.

FIG. 2 depicts a detailed view of a DSP 200, which is an example of a bid generation computer system 110 of FIG. 1. DSP 200 includes a bid pricing system 202 (e.g., bid pricing system 110D of FIG. 1) and a bid optimizer system 204 (e.g., bid optimizer system 110C of FIG. 1).

Bid pricing system 202 may receive bid requests 206 from content placement systems such as content networks, content exchanges, and/or SSPs. The received bid request may include context information 216. Context information is information associated with a bid request, and may include parameters of an auction such as time, place, location, and so forth. Various examples of context information are described below with respect to step 302 of FIG. 3. Bid pricing system 202 may further retrieve campaign information 208 stored by the DSP (e.g., campaign information 110A of FIG. 1).

Bid pricing system 202 may determine an initial bid 218 based on campaign information 208 and/or other information received from a secondary content provider. Bid pricing system 202 may determine initial bid 218 based on pacing, campaign information associated with different secondary content providers, and the like, as described further below with respect to 304 of FIG. 3.

Bid optimizer system 204 may include software configured to compute an optimized final bid. Bid optimizer system 204 may include a clearing price predictor subsystem 212 for computing a predicted clearing price 236. In some embodiments, predicted clearing price 236 may be determined by the clearing price predictor subsystem 212 based on a quantile 234 determined by quantile subsystem 210. Optimizer subsystem 214 may determine an final bid 240 based on the predicted clearing price 236. The final bid 240 may further be computed by optimizer subsystem 214 based on initial bid 218 determined by bid pricing system 202.

Quantile subsystem 210 may include software configured to select a quantile 234 for use in predicting predicted clearing price 236. Quantile subsystem 210 may retrieve quantile computation rules 224. For example, quantile subsystem 210 may identify stored quantile computation rules 224 which have been previously configured by an administrator, such as defining the quantile based on pacing according to a particular algorithm. Alternatively, or additionally, quantile 234 may be configured via user input 222 received from a user 220. For example, a prospective content provider may manually select a quantile to control aggressiveness of a bid.

Clearing price predictor subsystem 212 may include software configured to predict a predicted clearing price 236. Clearing price predictor subsystem 212 may receive quantile 234 from quantile subsystem 210 and use quantile 234 in selecting or refining a predictor model. Preconfigured predictor models 226 may be received via model generator/trainer 230, which may be part of DSP 200, or communicatively coupled to DSP 200. Model generator/trainer 230 may generate and/or train the models using historical clearing price data 232. Clearing price predictor subsystem 212 may retrieve context information 216 from bid request 206.

Optimizer subsystem 214 may include software configured to calculate an optimized final bid 240. Optimizer subsystem may retrieve rules, models, and parameters 228. Optimizer subsystem 214 may receive a predicted clearing price 236 from clearing price predictor subsystem 212. Optimizer subsystem 214 may receive initial bid 218 from bid pricing system 202. Optimizer subsystem 214 may use the rules, models, and/or parameters 228, initial bid 218, and predicted clearing price 236 to calculate optimized final bid 240. For example, optimizer subsystem 214 may input initial bid 218 and predicted clearing price 236 into a particular equation, with output of optimized final bid 240, as described below with respect to FIG. 5.

Figure 3:
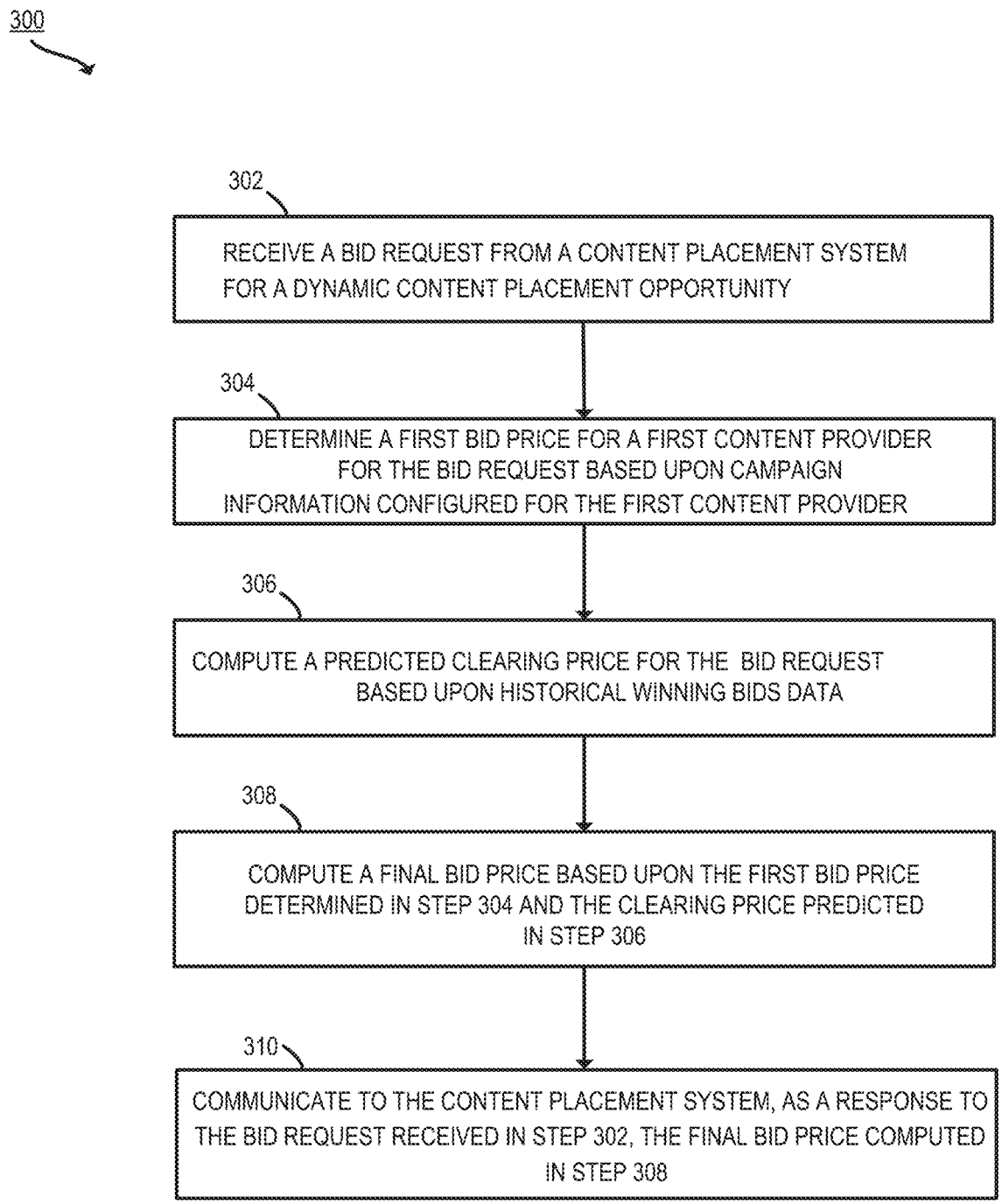
FIG. 3 depicts an example of a flow for optimized bidding, according to certain embodiments.

FIG. 3 depicts a simplified flowchart 300 depicting a method for performing optimized bidding according to certain embodiments. The processing depicted in FIG. 3 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1 and 2, the processing depicted in FIG. 3 may be performed by a DSP in cooperation with other elements of a distributed system, as illustrated FIG. 1.

Before the processing depicted in FIG. 3, a user may have navigated to a web page (e.g., via a browser of a user device, as illustrated in FIG. 1). The web page may be associated with a dynamic content placement opportunity. The publisher of the web page may transmit information about the dynamic content placement opportunity to a content placement system (e.g., an SSP and/or content delivery system). The content placement system may then transmit a corresponding bid request to a DSP.

At step 302, a bid request is received for a particular dynamic content placement opportunity. The bid request may be received by a bid generation computer system from a content placement system.

The bid request may include context information. The context information may include user context (e.g., information identifying the user to potentially view the dynamic online content). Information that identifies the user may include user location, information about the user's user device, Internet Protocol (IP) address, name, demographics, and the like. The context information may include information about an auction, such as the type of the auction (e.g., whether the auction a first-price auction, a second-price auction, or some other type of auction). The context information may include dynamic content context information identifying a type of dynamic content (e.g., whether the dynamic content is going to be an image, a banner, a video, and so forth; dynamic content context information may further include the length of a time slot, for example if the dynamic content is being shown as part of a video). The context information may include information identifying publisher content (e.g., the type of website/application/video that the user is loading or viewing).

Specific examples of context information which may be included in the bid request include
- site (e.g., a website on which the dynamic content to be placed)
- feed (e.g., information about a feed such as social media feed on which the dynamic content is to be placed)
- bidding feed ID (an identifier used for preferred deals and private auctions)
- seller (e.g., entity selling the dynamic content, such as a host of a webpage or application)
- Operating System (OS) on which dynamic content is to be served
- browser on which dynamic content is to be served
- region identifier identifying region in which dynamic content will be served
- metro identifier identifying metropolitan area in which the dynamic content is to be served
- device type identifying a device on which the dynamic content is to be served
- day of week
- hour of day
- position (e.g., position on website for display such as top banner, side, or in-feed)
- dynamic content type (e.g. mobile web or in-app video)
- creative area (e.g., banner, flash, or image with embedded link)
- auction type (e.g., first-price or second-price)
- highest bid (e.g., established by bidder)
- lowest floor price (e.g., established by bidder)

At step 304, for a secondary content provider, an initial bid for the dynamic content placement opportunity received in step 302 is determined. One or more interested campaigns of content providers may be determined based on the context information received in step 302. For example, a DSP may identify campaign information corresponding to a variety of secondary content providers. A subset of these secondary content providers may have previously indicated interest in placing dynamic online content in a particular context. The campaign information may, for example, specify that the secondary content provider seeks to present dynamic content to a particular demographic of user and/or via a particular platform (e.g., a particular website, type of website, or applications). The campaign information may further specify information about the dynamic content (creatives) to be placed, such as the type of dynamic content and the details of the content thereof.

An initial bid is generated for the interested campaign. The initial bid is generated based upon at least a subset of the information received in step 302. The initial bid may reflect how important the dynamic content placement is for the campaign for the secondary content provider. Processing for generating the bid may be performed by bid pricing system 202 of DSP 200 depicted in FIG. 2.

In some embodiments, the initial bid is generated based upon campaign information, which may be stored by the DSP. As an example, an algorithm for determining an initial bid may take into account campaign parameters provided by the secondary content provider. These parameters may be related to pacing information, click rates, conversion rates, and so forth. Based on such information, the algorithm may quantify how much the dynamic content placement opportunity is worth to that particular secondary content provider. Specific examples of information that may be used to compute an initial bid include pace (e.g., spend $1,000 in three days), targets (certain verticals, target demographic information, and the like), economic value to the secondary content provider (e.g., this dynamic content placement is worth ½₀ cent to the secondary content provider), a minimum bid, and a maximum bid. Accordingly, the initial bid may be determined based on a combination of context information received in connection with the dynamic content placement opportunity and campaign information configured by prospective secondary content providers.

At step 306, a predicted clearing price is computed for the bid request received in 302. The predicted clearing price is computed based upon historical winning bids data, as described in further detail below with respect to FIG. 4. The processing in step 306 may be performed by clearing price predictor subsystem 212 of bid optimizer system 204 shown in FIG. 2.

At step 308, a final bid is computed. The final bid is computed based upon the initial bid generated in step 304 and the predicted clearing price predicted in step 306, as described in further detail below with respect to FIG. 5. The processing in step 308 may be performed by optimizer subsystem 214 of bid optimizer system 204 depicted in FIG. 2.

At step 310, the final bid computed in step 308 is communicated to the content placement system as a response to the bid request received in step 302. The final bid may, for example, be transmitted in a message to a SSP or pushed to an Application Programming Interface (API) exposed by a content network.

The final bid may be computed and communicated in a matter of milliseconds. In some embodiments, the method of FIG. 3 may be performed in less than about 50 milliseconds.

Communicating the final bid may cause a primary content provider to provide a user device access to a web page having dynamic content associated with the secondary content provider. For example, a primary content provider server may serve primary content (e.g., a video or web page) along with the dynamic content selected based on a winning bid. If the bid generation computer system has selected a winning bid, and the secondary content provider wins the bidding process, then the dynamic content that the secondary content provider bid to place is served by the primary content provider. The bid generation computer system may cause the primary content provider to provide the content, for example, by transmitting a notification to the primary content provider, along with the dynamic content to be displayed. Accordingly, the dynamic online content can be displayed in real-time based on selection of an appropriate bid.

Figure 4:
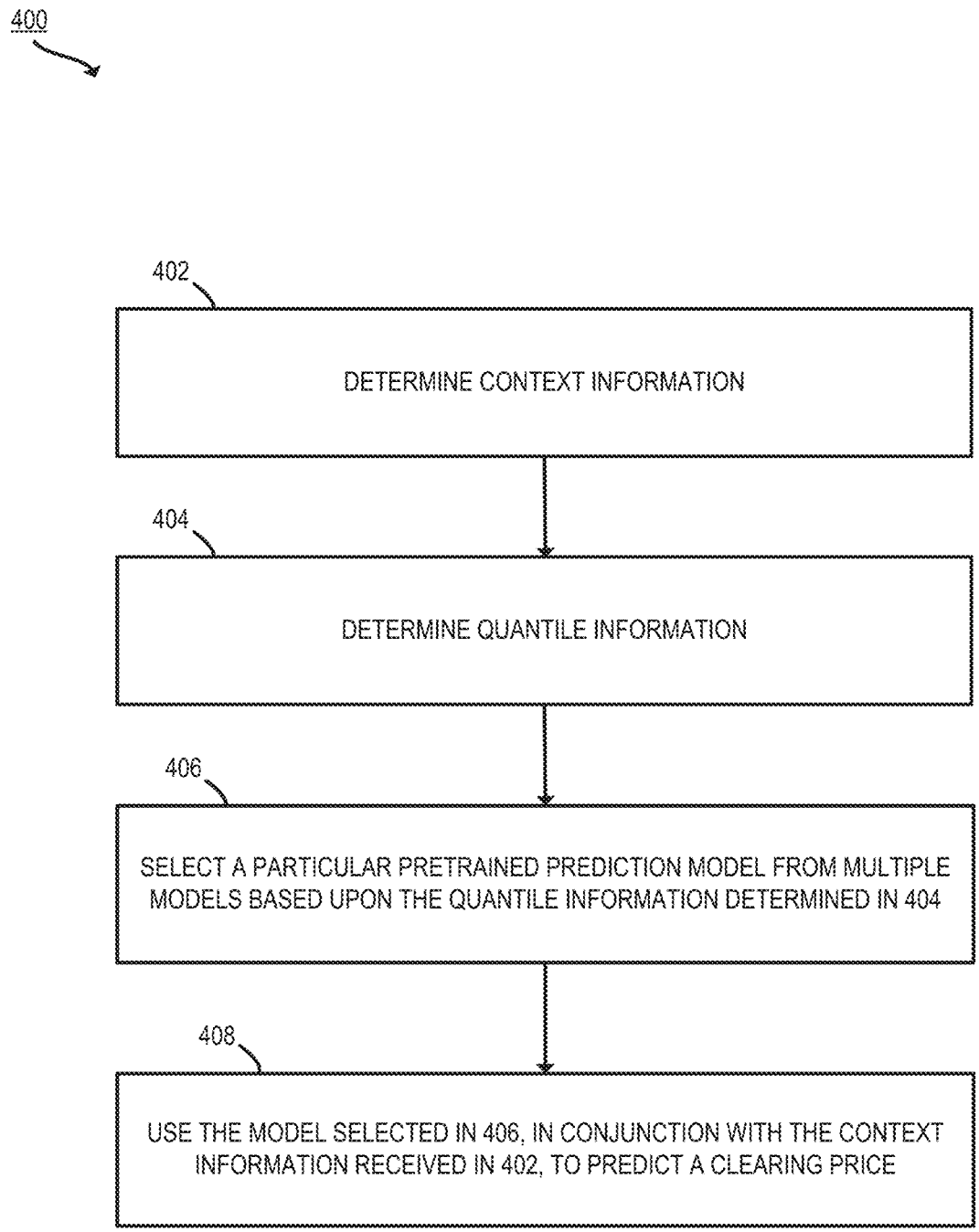
FIG. 4 depicts an example of a process for predicting a clearing price, according to certain embodiments.

FIG. 4 depicts a simplified flowchart 400 depicting a method for predicting a clearing price, according to certain embodiments (e.g., in step 306 of the flow described above with respect to FIG. 3). The processing depicted in FIG. 4 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1 and 2, the processing depicted in FIG. 4 may be performed by a DSP in cooperation with other elements of a distributed system, as illustrated FIG. 1. In particular, the processing depicted in FIG. 4 may be performed by clearing price predictor subsystem 212 of bid optimizer system 204 shown in FIG. 2.

At step 402, context information is determined. As described above with respect to FIG. 3, various context information may be received in connection with a bid request, such as information that identifies the user, the publisher content, a type of auction, and/or a type of dynamic online content.

At step 404, quantile information is determined. The quantile information corresponds to a selected percentile (or quantile) of historical clearing price data. As an example, the following are ten clearing prices (in cost per thousand impressions (CPM) in dollars) from ten respective auctions (numbered 1-10):

| 1 | 2 | 3 | 4 | 5 | 6 | 7 | 8 | 9 | 10 |
|---|---|---|---|---|---|---|---|---|----|
| 0.5 | 0.6 | 0.6 | 0.6 | 0.8 | 0.8 | 0.8 | 1.5 | 2.5 | 100 |

Based on the above data points, for example, the $80^{th}$ quantile (percentile) of clearing price is $1.5.

The quantile can be used to select a pretrained clearing price model. For example, the clearing price model is a pretrained quantile regression model, and the quantile is a hyperparameter of the model. In training such a model, when quantile regression is applied to segregate the data, the clearing price distribution is divided by the quantile. For example, a 90th quantile model will divide the clearing prices into the top 10% and the bottom 90%. Different quantiles may correspond to different levels of aggressiveness. The quantiles may include $10^{th}$, $20^{th}$, $30^{th}$, $40^{th}$, $50^{th}$, $60^{th}$, $70^{th}$, $80^{th}$, and $90^{th}$. The higher the quantile, the higher the confidence of winning a bid using the predicted clearing price (e.g., using the $90^{th}$ quantile, there would be roughly 90% confidence that the predicted clearing price is high enough to win the auction).

In some embodiments, the quantile information is calculated based on context information and/or campaign information configured by the prospective secondary content provider. The quantile information may be identified by quantile subsystem 210 and transmitted to clearing price predictor subsystem 212, as shown in FIG. 2.

In some embodiments, the quantile may be automatically determined using rules based upon certain criteria. The rules may take into account various campaign-related parameters and information related to the dynamic content placement opportunity. In some embodiments, quantile information may be identified using a model that selects a quantile based on campaign-related information. For example, the quantile is determined based on pacing information. If a spending pace is falling behind target, then a larger quantile may be selected to increase aggressiveness. On the other hand, if spending pace is ahead of a target, then a lower quantile value may be selected, for a less aggressive prediction.

A secondary content provider may, at an initial time, establish pacing preferences for a given campaign. The pacing preferences could establish that the prospective secondary content provider is willing to spend a certain dollar amount over the course of a campaign for a certain time period (e.g., $500 over a week). The DSP may then compute an appropriate pace at which to spread out dynamic content over the course of the week whilst spending the $500. Based on the pace, the DSP may then identify the quantile. The quantile may be computed as a function of the pace using an algorithm. Alternatively, or additionally, rules may be used to select a quantile based on the pace. As a specific example, the following rules may be implemented:

pace<50%: 90th quantile
50≤pace<70: 80th quantile
70≤pace≤90: 70th quantile
pace>90: 60% quantile This rule set will increase the aggressiveness as the pacing falls short of a target.

Alternatively, or additionally, the quantile information is identified based on input received from a prospective secondary content provider. For example, the secondary content provider may manually select a quantile for use in optimizing a bid.

At step 406, a particular pretrained prediction model is selected from multiple trained models based upon the quantile information determined in 404. In some embodiments, different trained models are provided and stored for different quantiles (e.g., 90%, 80%, 70%, etc.). From among the multiple models for different quantiles, the quantile information is then used to select a particular trained model.

As an example, models may be a linear regression models, such as pretrained quantile regression models. A quantile regression model may be expressed as:

$$\min_u E(\rho_\tau(Y-u)) = \qquad (1)$$

$$\min_u \left\{ (\tau-1)\int_{-\infty}^{u}(y-u)dF_Y(y) + \tau\int_{u}^{\infty}(y-u)dF_y(y) \right\}$$

where Y is a real-valued random value with cumulative distribution function $$F_y(y)=P(Y\geq y) \qquad (2)$$

τ is the quantile, expressed as a number from 0 to 1. The $\tau^{th}$ quantile of Y is:

$$Q_y(\tau)=F_Y^{-1}(\tau)=\inf\{y:F_Y(y)\le\tau\} \quad (3)$$

$\rho_\tau(y)$ is the loss function:

$$\rho\tau(y)=y(\tau-I_{y<0}) \quad (4)$$

where $I_y$ is an indicator function. By minimizing the expected loss of Y−y with respect to u according to Equation (1), the $\tau^{th}$ quantile of variable Y can be determined:

$$F_Y(q_\tau)=\tau$$

Quantile regression models the clearing price at a certain quantile. For example, an 80% quantile model predicts what the price would be at the 80th percentile given the context information. Advantageously, specifying the quantile controls how conservative the clearing price prediction will be.

In some embodiments, different sets of pre-trained models are stored for different contexts. Prior to selecting a particular model corresponding to the quantile information, the system may select a set of models corresponding to a subset of the context information received in step 402. Accordingly, as part of the processing in step 404, based upon the content information received in step 402, a matching context for which a set of models is stored is first determined. The matching context may be an exact match to the context information received in step 402 or may be the best match from the contexts of available models. For example, a set of quantile regression models is selected which were trained on data from historical video-based content, excluding banner content and text content. For the models stored for that context, a particular model may be selected for the quantile.

In some embodiments, a model selection algorithm is used to select models. For example, a model selection vector is built based upon the context and the quantile, and the model vector is then used to select a particular model, from among multiple available models, to perform the clearing price prediction.

At step 408, the model selected in step 406 is used to predict a clearing price. The model may take one or more elements of context information as input, and output a clearing price. For example, the context information: type of dynamic online content, location, and time of day may be input into an $80^{th}$ quantile regression model, and output a particular predicted clearing price corresponding to that context information.

Alternatively, or additionally, the predicted clearing price may be determined using a look-up table. The table may, for example, map predicted clearing prices to auction features corresponding to context information.

In some embodiments, the models are pretrained before executing the operations of FIG. 4. The models may be predictive models trained on historical winning bids data. The historical winning bids data includes a plurality of data points, each data point corresponding to a historical winning bid and a clearing price corresponding to the historical winning bid. The data points may specify the amount of the winning bid (e.g., 1 cent). The data points may map each winning bid amount to details of the auction, dynamic online content, and/or target user to view the dynamic online content. For example, the models may be trained on a set of winning bids, taking into consideration context information such as the time of the bid, the place of the bid, characteristics of the target user to view the dynamic online content, the type of web page hosting the dynamic online content, and so forth. Winning bid amounts may be used to train the models. In some embodiments, losing bid amounts may further be used to train the models.

In some embodiments, a subset of historical data may be removed from the training data to avoid skewing the data with outliers. For example, a normal distribution of historical data may be selected for training the models. As a specific example, "panic mode" data may be removed from the training data. If an dynamic online content provider is overly aggressive and bids excessively due to an unusually high demand for winning a particular auction, the dynamic online content provider may bid in panic mode, and inclusion of panic mode data can be undesirable. Accordingly, such panic mode data may be eliminated from the training data. Panic mode data may, for example, be defined as data that is more than three standard deviations above a mean of the winning bids data used.

In some embodiments, multiple models are trained for different contexts. For example, one model (or set of models) may be trained based on data corresponding to historical auctions for placing dynamic content in the form of a video. Another model (or set of models) may be trained for auctions for placing dynamic content in an image banner. Using separate sets of models for different contexts can improve the accuracy of the predicted clearing price, as winning bids can vary considerably according to parameters such as the form of the dynamic content.

In some embodiments, subsequent to determining a final bid as described above with respect to FIG. 3, the models are retrained. An auction may be completed, and information received for a winning bid for the new dynamic content placement opportunity. This information may include the amount of the winning bid, as well as context information such as the type of dynamic content, time of day, location, and so forth. The pretrained model is then updated based on the received information. The models may be continuously or periodically retrained as new data is received, to keep the models fresh and improve the accuracy of predictions.

Figure 5:
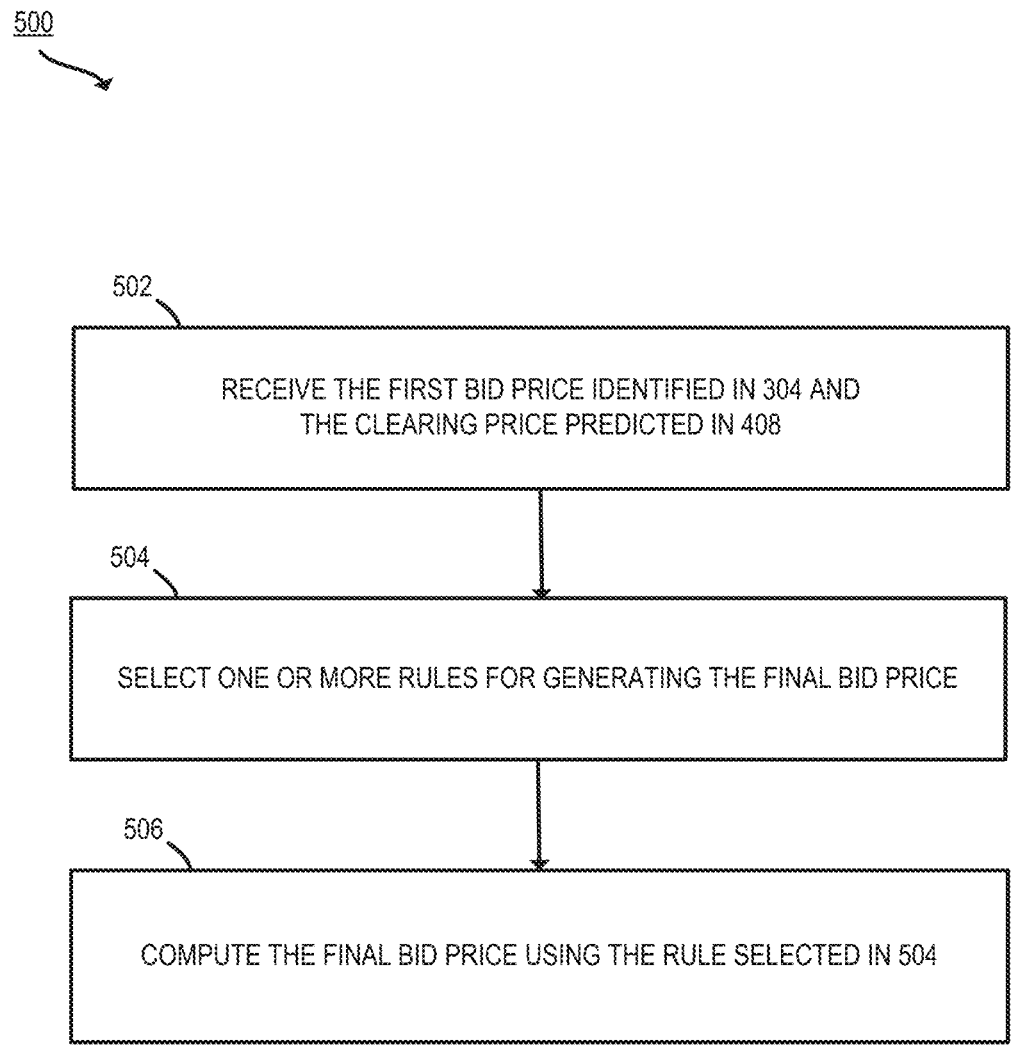
FIG. 5 depicts an example of a process for computing an optimized bid, according to certain embodiments.

FIG. 5 depicts a simplified flowchart 500 depicting a method for computing an optimized final bid, according to certain embodiments (e.g., in step 308 of the flow described above with respect to FIG. 3). The processing depicted in FIG. 5 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1 and 2, the processing depicted in FIG. 5 may be performed by a DSP in cooperation with other elements of a distributed system, as illustrated FIG. 1. In particular, the processing depicted in FIG. 5 may be performed by optimizer subsystem 214 of bid optimizer system 204 shown in FIG. 2.

At step 502, the initial bid determined in step 304 and the clearing price predicted in step 408 are received. The optimizer subsystem of the DSP may receive the initial bid from the bid pricing system and the clearing price from the clearing price predictor subsystem.

At step 504, one or more rules for generating the final bid are selected. The optimizer subsystem may, for example, retrieve stored rules from a database managed by the DSP.

In some embodiments, different rules may be used for different context information and/or based on campaign information. Rules may be used to generate a final bid as a function of both the clearing price and the initial bid.

Examples of such rules include (where eb is the initial bid, cp is the predicted clearing price, and B is the final bid):

B=min (eb, cp(wr))—Final bid is the minimum of the initial bid and the predicted clearing price at a certain win rate (wr, e.g., ratio of the number of impressions won to the number of impressions bid).

B*eb+(1−B)*cp—Final bid is a linear combination of the initial bid and the predicted clearing price.

B=f(pace)—Final bid is a function of pace.

B=f(pace, confidence)—Final bid is a function of pace and the confidence of the prediction of the clearing price.

cp(eb) s.t. wr(eb)~wr(cp(eb))—Final bid is modified such that the same win rate (wr) is maintained, while dropping the initial bid as much as possible. For instance, if $8 achieves a win rate of 92% but $3 achieves a win rate of 89%, set final bid to $3 instead of $8.

Return on Investment (ROI) based controller—Given a clearing price estimation, the return on investment for an auction may be estimated (e.g., based on cost of impression and revenue for advertised good or service).

At step 506, a final bid is computed using the rule(s) selected in step 504. For example, the final bid may be set to a minimum of the predicted clearing price and the initial bid. Computing the final bid may include selecting a lower price of the initial bid and the predicted clearing price as the final bid. As a specific example, the predicted clearing price is $0.005. The initial bid is $0.007. The minimum of the two, $0.005, is selected and set to the final bid.

In some embodiments, computing the final bid includes computing a new price based upon a function of initial bid and the predicted clearing price. The new bid may be indicated as the final bid. The new bid may be different from both the initial bid and the predicted clearing price.

In some embodiments, the final bid is the minimum of the initial bid and the clearing price at a fixed win rate (e.g. 35%). For the clearing price part of the equation, the quantile can be tuned to select a generous price. For instance, if the initial bid is $10 and the clearing price predicts the auction to cost $8, then the final bid is $8. The main benefit of this solution is that it focuses specifically on not overpaying by a large amount. Instead of calculating a very accurate clearing price and building the bidding strategy around it, this strategy avoids excessive overbidding.

In particular, the following rule may be used:

$$\text{bid} = \min(\text{existing bid}, X \text{ percentile of clearing prices}) +$$
$$(\text{number of placements} - \text{rank of placements})^* \text{eps} =$$
$$\min(\text{existing bid}, \text{clearing price prediction}) +$$
$$(\text{\# placements} - \text{rank of placement})^* \text{eps}.$$

Epsilon (eps) may be a very small number (e.g., 0.0001). This model includes order invariance by selecting an internal winner within the DSP based on how much the secondary content providers are willing to bid before the clearing price modification.

As another example, an ROI model can be applied based on pace. If a campaign is behind pace, then bidding can be restricted to auctions that have a ROI of 0.5× or more. If a campaign is ahead of pace, bidding can be restricted to auctions with a ROI of 2× or more.

Alternatively, or additionally, a threshold may be implemented in computing the final bid. For example, the secondary content provider may establish a maximum price to pay of $0.0006 per impression. The minimum of the initial bid and the predicted clearing price is determined to be $0.0007. The final bid may be further reduced to $0.0006 so as not to exceed the established threshold.

The above techniques for bidding with an optimized final bid have multiple advantages. For example, the final bid can be determined more quickly and with higher computational efficiency than using prior techniques. Real-time bidding requires a bid to be placed in milliseconds. Determining the final bid should be done in approximately three to five milliseconds. By selecting from a plurality of pretrained models as described herein, the amount of computation and time is reduced, as compared to using techniques of prior systems.

Further, the techniques described herein can produce an optimized final bid that is more sensitive to a secondary content provider's needs, as compared to prior systems. By taking into account both the value to the secondary content provider and the predicted clearing price, an optimized final bid can be determined which is tailored how much an secondary content provider is willing to pay without being unnecessarily large and leading to overspending.

There are multiple advantages in using a quantile regression model in predicting a clearing price. Quantile regression is robust to outliers. Many predictive models, such as those that use a centered log function, can exaggerate the effects of outliers. By computing a scaled absolute difference, quantile regression is much more robust to the outliers that such models. Further, quantile regression is insensitive to inflation and does not make distribution assumptions. Accordingly, using quantile regression to predict the clearing price provides an accurate prediction.

Figure 6:
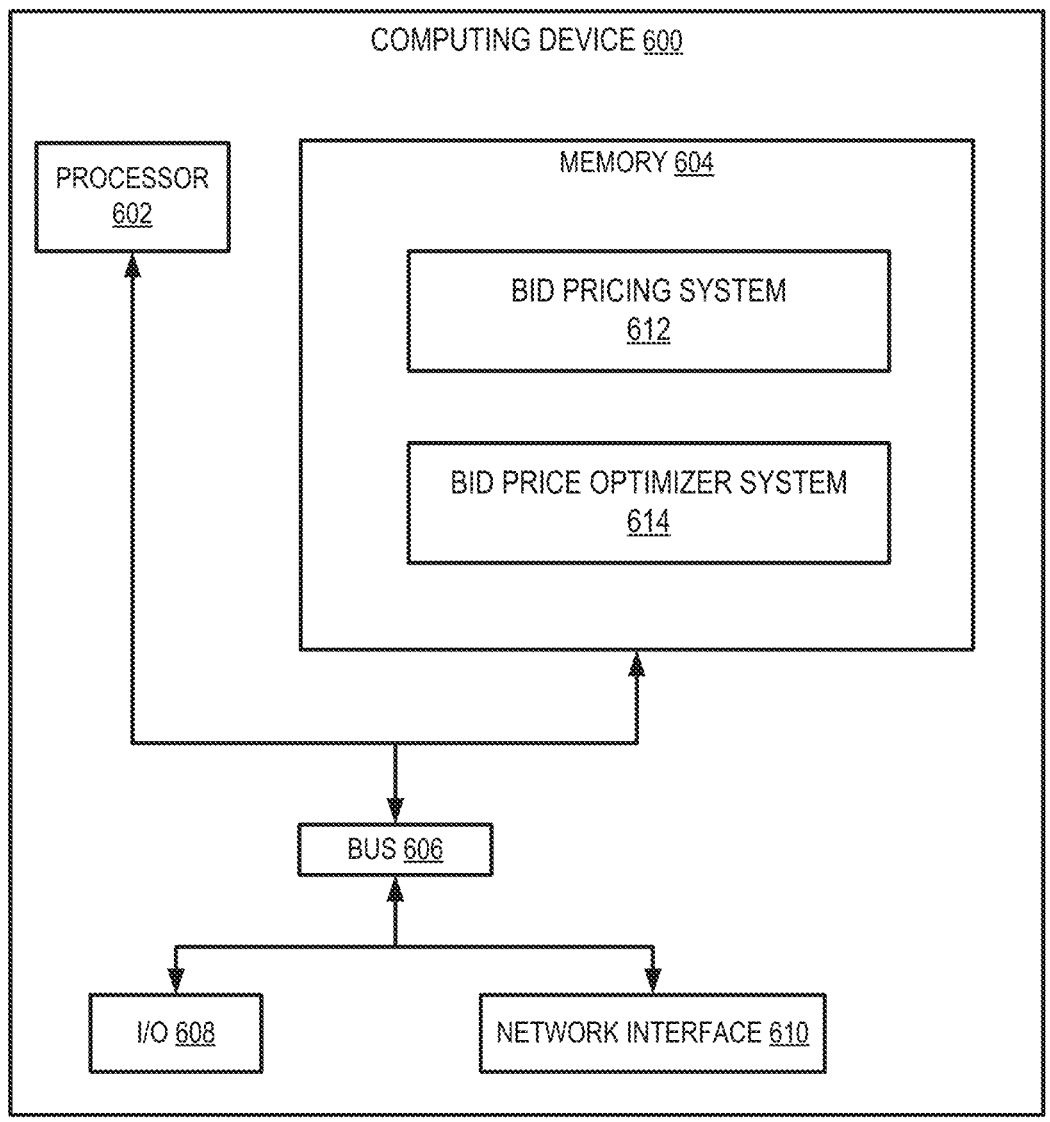
FIG. 6 depicts an example of a computer system that performs certain operations described herein, according to certain embodiments.

Any suitable computer system or group of computer systems can be used for performing the operations described herein. For example, FIG. 6 depicts examples of a computing device 600 that executes bid optimization.

The depicted examples of a computing device 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing device 600 may also include a number of external or internal devices, such as input or output devices. For example, computing device 600 is shown with one or more input/output ("I/O") interfaces 608. An I/O interface 608 can receive input from input devices or provide output to output devices. One or more buses 606 are also included in the computing device 600. The bus 606 communicatively couples one or more components of a respective one of the computing device 600.

The computing device 600 executes program code that configures the processor 602 to perform one or more of the operations described herein. The program code may correspond to the bid pricing system 612 (e.g., bid pricing system 202 of FIG. 2) and bid optimizer system 614 (e.g., bid optimizer system 204 of FIG. 2) and/or other suitable applications that perform one or more operations described herein. The program code may be resident in the memory device 604 or any suitable computer-readable medium and may be executed by the processor 602 or any other suitable processor. In some embodiments, the bid pricing system 612 and bid optimizer system 614 are stored in the memory device 604, as depicted in FIG. 6. In additional or alternative embodiments, one or more of the bid pricing system 612 and bid optimizer system 614 are stored in different memory devices of different computer systems. In additional or alternative embodiments, the program code described above is stored in one or more other memory devices accessible via a data network.

In some embodiments, one or more of these data sets, models, and functions are stored in the same memory device (e.g., the memory device 604). For example, a platform, such as the DSP 200 depicted in FIG. 2 can host the bid pricing system 612 and bid optimizer system 614. In additional or alternative embodiments, one or more of the programs, data sets, models, and functions described herein are stored in one or more other memory devices accessible via a data network.

The computing device 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and the like. The computing device 600 is able to communicate with one or more other computing devices via a data network using the network interface device 610.

In some embodiments, the functionality provided by the computing device 600 may be offered via a cloud-based service provided by a cloud infrastructure 700 of a cloud service provider.

Figure 7:
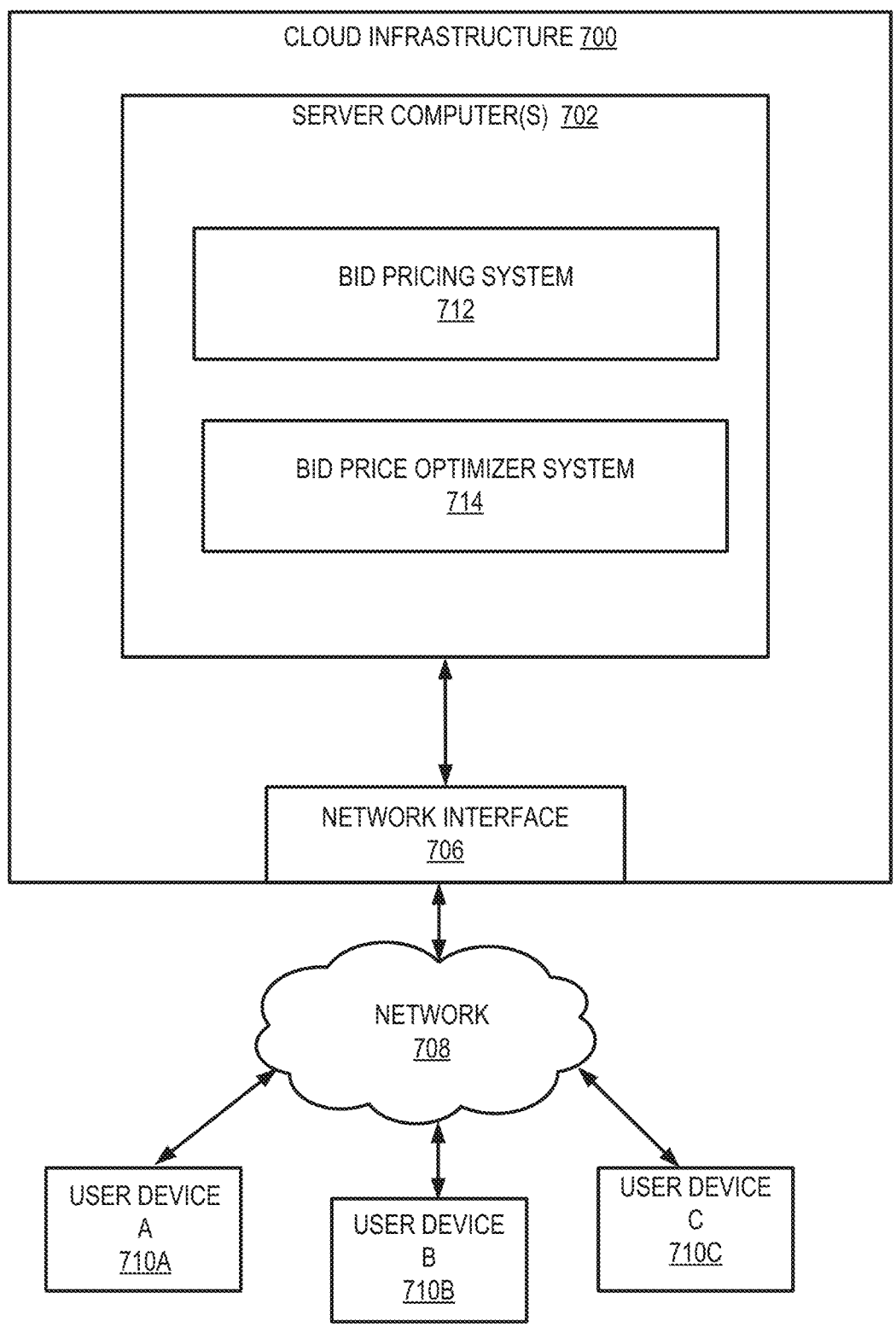
FIG. 7 depicts another example of a computer system that performs certain operations described herein, according to certain embodiments.

For example, FIG. 7 depicts an example of a cloud infrastructure 700 offering one or more bidding services that can be used by a number of user subscribers using user devices 710A, 710B, and 710C across a network 708. In certain embodiments, the DSP services provided by cloud infrastructure 700 include a service that predicts a predicted bid based on parameters supplied by the user devices 710A, 710B, and 710C. For example, the user devices may correspond to secondary content providers and the parameters may correspond to campaign information. In some cases, the DSP services may be offered under a Software as a Service (SaaS) model. One or more users may subscribe to the DSP services, and the cloud infrastructure 700 performs the processing to provide the DSP services to subscribers. The cloud infrastructure 700 may include one or more remote server computer(s) 702.

In the embodiment depicted in FIG. 7, the cloud infrastructure 700 includes one or more server computer(s) 702 that are configured to perform processing for providing one or more services offered by the cloud service provider. One or more of server computer(s) 702 may implement a bid pricing system 712 (which could provide functionalities similar to bid pricing system 202 depicted in FIG. 2) and a bid optimizer system 714 (which could provide functionalities similar to bid optimizer system 204 depicted in FIG. 2). Systems 712 and 714 may be implemented using software only (e.g., code, program, or instructions executable by one or more processors provided by cloud infrastructure 700), in hardware, or combinations thereof. For example, one or more of the server computer(s) 702 may execute software to implement the services and functionalities provided by bid pricing system 712 and bid optimizer system 714, where the software when executed by one or more processors of the server computer(s) 702 causes the services and functionalities to be provided.

The code, program, or instructions may be stored on include any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 702 can include volatile memory, non-volatile memory, or a combination thereof.

In the embodiment depicted in FIG. 7, cloud infrastructure 700 also includes a network interface device 706 that enables communications to and from the cloud infrastructure 700. In certain embodiments, the network interface device 706 includes any device or group of devices suitable for establishing a wired or wireless data connection to the network 708. Non-limiting examples of the network interface device 706 include an Ethernet network adapter, a modem, and/or the like. Cloud infrastructure 700 is able to communicate with user devices 710A, 710B, and 710C via network 708 using network interface device 706.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device. Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
receiving, by a bid generation computer system and from a content placement system, a bid request for a dynamic content placement opportunity;
identifying a pace of a campaign, the pace representing an amount intended to be spent per a time unit compared to an amount actually spent in a subset of the time unit;
determining, by the bid generation computer system, a quantile value, corresponding to a selected percentile of historical clearing price data, based on the identified pace of the campaign;
predicting, by the bid generation computer system, a clearing price for the bid request by applying a pretrained model to information associated with the received bid request, wherein the quantile value is a hyperparameter of the pretrained model used to control bidding aggressiveness and to reduce a likelihood of overbidding or underbidding, and wherein the pretrained model was trained on historical winning bids data identifying historical clearing prices corresponding to historical winning bids;
computing, by the bid generation computer system, a final bid based upon the predicted clearing price; and
communicating the final bid from the bid generation computer system to the content placement system, wherein communicating the final bid to the content placement system causes a primary content provider to provide a user device with access to dynamic online content, wherein the receiving, determining, selecting predicting, computing, and causing the final bid to be communicated are performed in less than about 50 milliseconds.

2. The method of claim 1, further comprising:
receiving information for a winning bid for the dynamic content placement opportunity; and
updating the pretrained model based on the received information for the winning bid.

3. The method of claim 1, wherein the pretrained model is a quantile regression model.

4. The method of claim 1, wherein the dynamic content placement opportunity is triggered in response to a request from a user to the primary content provider for publisher content, and wherein the information associated with the bid request identifies the user, the publisher content or a type of dynamic content.

5. The method of claim 1, wherein computing the final bid comprises:
selecting a lower price of an initial bid and the predicted clearing price as the final bid.

6. The method of claim 1, wherein computing the final bid comprises:
computing a new price based upon a function of an initial bid and the predicted clearing price; and
indicating the new price as the final bid.

7. The method of claim 1, further comprising:
selecting, by the bid generation computer system using a model selection vector, the pretrained model from a plurality of pretrained models.

8. The method of claim 1, wherein the final bid is for an auction and the clearing price is further based on a type of the auction.

9. A computer system comprising:
a bid generation system comprising a network interface and processing hardware, wherein the network interface is communicatively coupled to a content placement system, wherein the processing hardware is configured for:
receiving, from the content placement system, a bid request for a dynamic content placement opportunity;

identifying a pace of a campaign, the pace representing an amount intended to be spent per a time unit compared to an amount actually spent in a subset of the time unit;

using the identified pace to determine a quantile value corresponding to a selected percentile of historical clearing price data;

predicting a clearing price for the bid request by applying a pretrained model to information associated with the bid request, wherein the quantile value is a hyperparameter of the pretrained model used to control bidding aggressiveness and to reduce a likelihood of overbidding or underbidding, and wherein the pretrained model was trained on historical winning bids data identifying historical clearing prices corresponding to historical winning bids;

computing a final bid based upon the predicted clearing price; and communicating the final bid to the content placement system, thereby causing the content placement system to notify a content provider of the final bid, wherein the content provider thereby provides a user device with access to dynamic online content, wherein the receiving, determining, selecting predicting, computing, and causing the final bid to be communicated are performed in less than about 50 milliseconds.

10. The computer system of claim 9, further comprising:
receiving information for a winning bid for the dynamic content placement opportunity; and
updating the pretrained model based on the received information for the winning bid.

11. The computer system of claim 9, wherein the pretrained model is a quantile regression model.

12. The computer system of claim 9, wherein the dynamic content placement opportunity is triggered in response to a request from a user for publisher content, and wherein the information associated with the bid request identifies the user, the publisher content or a type of dynamic content.

13. The computer system of claim 9, wherein computing the final bid comprises:
selecting a lower price of an initial bid and the predicted clearing price as the final bid.

14. The computer system of claim 9, wherein computing the final bid comprises:
computing a new price based upon an initial bid and the predicted clearing price; and
indicating the new price as the final bid.

15. The computer system of claim 14, wherein the new price is different from the initial bid and the predicted clearing price.

16. A non-transitory computer-readable medium having instructions stored thereon, the instructions executable by a processing device to perform operations comprising:
receiving, from a content placement system, a bid request for a dynamic content placement opportunity;
identifying a pace of a campaign, the pace representing an amount intended to be spent per a time unit compared to an amount actually spent in a subset of the time unit;
using the identified pace of the campaign to determine a quantile value corresponding to a selected percentile of historical clearing price data;
using a pretrained quantile regression model, predicting a clearing price for the bid request using information associated with the bid request, wherein the quantile value is a hyperparameter of the pretrained model used to control bidding aggressiveness and to reduce a likelihood of overbidding or underbidding, and wherein the pretrained model was trained on historical winning bids data identifying historical clearing prices corresponding to historical winning bids;
computing, based upon the predicted clearing price, a final bid; and
communicating the final bid to the content placement system as a response to the bid request, wherein the receiving, determining, selecting predicting, computing, and causing the final bid to be communicated are performed in less than about 50 milliseconds.

* * * * *